United States Patent
Brand et al.

(10) Patent No.: US 11,473,454 B2
(45) Date of Patent: Oct. 18, 2022

(54) METHOD FOR PRODUCING A CAM PHASER AND CAM PHASER

(71) Applicant: ECO Holding 1 GmbH, Marktheidenfeld (DE)

(72) Inventors: Michael Brand, Nuertingen (DE); Stephan Wanner, Biberach an der Riss (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 16/938,954

(22) Filed: Jul. 25, 2020

(65) Prior Publication Data
US 2021/0025294 A1 Jan. 28, 2021

(30) Foreign Application Priority Data
Jul. 25, 2019 (DE) .......................... 102019120083.0

(51) Int. Cl.
*F01L 1/344* (2006.01)
*B23K 26/28* (2014.01)
*B23K 101/00* (2006.01)

(52) U.S. Cl.
CPC ............ *F01L 1/3442* (2013.01); *B23K 26/28* (2013.01); *B23K 2101/005* (2018.08); *F01L 2303/00* (2020.05)

(58) Field of Classification Search
USPC ........................................... 123/90.17, 90.15
See application file for complete search history.

(56) References Cited

U.S. PATENT DOCUMENTS

| | | | |
|---|---|---|---|
| 2005/0087713 A1* | 4/2005 | Kawai .................... | F01L 1/3442 251/89 |
| 2005/0145208 A1* | 7/2005 | Wierl .................... | F01L 1/3442 123/90.17 |
| 2005/0155567 A1* | 7/2005 | Wierl .................... | F01L 1/3442 123/90.17 |
| 2006/0260578 A1* | 11/2006 | Boese .................... | F01L 1/022 123/90.17 |
| 2007/0095315 A1* | 5/2007 | Hoppe ................ | F15B 13/0402 123/90.17 |
| 2008/0184948 A1* | 8/2008 | Boese .................... | F01L 1/3442 123/90.17 |
| 2008/0236529 A1* | 10/2008 | Scheidig ............... | F01L 1/3442 123/90.17 |
| 2011/0186000 A1* | 8/2011 | Endo ........................ | F01L 3/20 123/188.2 |
| 2017/0037748 A1* | 2/2017 | Sebald .................. | F01L 1/3442 |

FOREIGN PATENT DOCUMENTS

DE 102013203245 A1 * 8/2014 ............ F01L 1/3442

* cited by examiner

*Primary Examiner* — Devon C Kramer
*Assistant Examiner* — Wesley G Harris
(74) *Attorney, Agent, or Firm* — Von Rohrscheidt Patents

(57) ABSTRACT

A method for producing a cam phaser for a cam shaft of an internal combustion engine, the cam phaser including a rotor, a stator and at least one cover, the method including arranging the at least one cover at the stator; and welding the at least one cover with the stator, wherein a first weld, a second weld and a third weld are formed at least on a large radius or on a small radius during the welding, and wherein the small radius is smaller than the large radius. The invention furthermore relates to a cam phaser for a cam shaft of an internal combustion engine, the cam phaser including a rotor; a stator and at least one cover.

3 Claims, 2 Drawing Sheets

METHOD FOR PRODUCING A CAM PHASER AND CAM PHASER

RELATED APPLICATIONS

This application claims priority from and incorporates by reference German patent application DE 10 2019 120 083.0 filed on Jul. 25, 2019 which is incorporated in its entirety by this reference.

FIELD OF THE INVENTION

The invention relates to a method for producing a cam phaser for an internal combustion engine including a stator, a rotor and at least one cover. The invention furthermore relates to a cam phaser for a cam shaft of an internal combustion engine including a rotor, a stator and at least one cover.

BACKGROUND OF THE INVENTION

Cam phasers are used in valve trains of internal combustion engines in order to be able to adjust a phase relationship between a crank shaft and a cam shaft in an optimum variable manner. Thus, pressure cavities are formed between the stator and the rotor that are covered by at least one cover towards the ambient. Thus, the cover is connected with the stator typically by a threaded connection in some cases also by a welded connection.

It is a disadvantage of known cam phasers, in particular of welded cam phasers that the cover is deformed in an undesirable manner, more in particular bulged outward due to the high pressure in the pressure chambers. Furthermore the known cam phasers require complex fabrication.

Thus, it is an object of the invention to make a cam phaser more stable, improve its engineering design and simplify fabrication.

The object is achieved by the independent patent claim. Advantageous embodiments can be derived from the dependent claims.

BRIEF SUMMARY OF THE INVENTION

The object is achieved in particular by a method for producing a cam phaser for a cam shaft of an internal combustion engine wherein the cam phaser includes a rotor, a stator and at least one cover, the method including arranging the at least one cover at the stator, welding the cover with the stator, wherein welds are formed at least on a large radius and/or on a small radius during welding, wherein the small radius is smaller than the large radius.

The cover covers the pressure chambers between the stator and the rotor towards an ambient. Since welds are fabricated according to the invention at least on the large radius and on the small radius when connecting the stator and the cover a more stable cam phaser is achieved.

The welds on the large radius are arranged on a common circle and the welds on the small radius are arranged on a common smaller circle. In addition to the welds on the small radius and on the large radius additional welds can also be provided on additional radii wherein the additional radii have a size that differs from the large radius and the small radius.

In particular the welds on the small radius provide that the cover is reliably attached at the stator also at a location that is radially further inside. Thus, the cover has less propensity to bulge outward due to the high pressure in the pressure chambers.

The cover is advantageously formed at least essentially disc shaped. Put simply a stability increasing weld is fabricated in addition to a weld that is arranged at an outer circular circumference, wherein the stability increasing weld is arranged at a position that is further inside.

The stator is advantageously made from sintered material, e.g. sintered carbon steel with a carbon content between 0.2 and 0.9%, in particular between 0.5 and 0.8%, in particular 0.6%. The cover is advantageously made from a non-sintered material, e.g. from steel with a carbon content of 0.2% at the most.

In an advantageous embodiment a circumferential weld is continuously formed at the large radius.

This means that the welds form a continuous, thus non-interrupted weld at the large radius. This yields a particularly stable connection between the cover and the stator.

In a particularly advantageous embodiment welds are formed on the large radius and on the small radius. Due to the radially inward portions a stability of the connection is high enough to effectively prevent a buckling of the thin cover.

In an advantageous embodiment a circumferential weld is formed that includes welds on the large radius and welds on the small radius.

Put differently the welds on the large radius and the welds on the small radius are connected with each other. Advantageously the circumferential weld extends along an outer circumference of the cover. Then the outer circumference of the cover is not a circle but also includes portions that are arranged radially further inside than the outer circumference. Advantageously the circumferential weld is also configured continuous. This facilitates a particularly quick and simple welding of the cover at the stator. Due to the radially inward portions a stability of the connection is high enough to effectively prevent a buckling of the cover.

According to an advantageous embodiment the circumferential weld is formed viewed in a rotation direction of the rotor at least along a clover shaped line.

In particular the weld is formed as a multi-leaf clover. The valve can be formed e.g. as a three leaf, or a four or five leaf clover. The number of the clover leaves is a function of functional requirements of the cam phaser. The clover leaf shape yields a particularly stable connection between the cover and the stator.

In an advantageous embodiment the weld seam is formed on the small radius separately from the weld seam on the large radius.

It is possible then to provide the weld on the smaller radius with spot welds. Also here the form of the cover can be provided less complex which generates cost savings.

According to an advantageous embodiment the weld is formed on the smaller radius.

For example the weld can be formed exclusively on the small radius. This generates cost savings and helps to prevent a bulging of the cover.

According to an advantageous embodiment the weld on the small radius is arranged and attached at a radially inward extending vane of the stator.

Advantageously several vanes are arranged at the stator, for example three, four or five vanes. The vane or the vanes extend from an annular body of the stator radially inward. Since the vanes represent the portions of the stator that extend radially inward at a maximum distance the vanes are particularly suited to form the small radius welds thereon.

Particularly advantageously the weld is arranged and attached on the small radius at an inward oriented end of the vane of the stator. Thus, the weld is attached at a point of the stator that is arranged closest to a center.

According to another advantageous embodiment a bore hole is configured at the radially inward extending vane of the stator.

The cover can be additionally attached at the stator at the bore hole. This makes the attachment between the two components particularly stable. The bore hole is already introduced into the stator before arranging the cover at the stator, thus before welding.

According to an advantageous embodiment the weld is configured on the small radius closer to a rotation axis of the rotor than the bore hole.

Thus, the bore hole is on a radius that is greater than the small radius. The weld on the small radius is therefore arranged at a location that is particularly far inward.

According to an advantageous embodiment of the invention the welds have a radial weld portion that extends at least essentially radially relative to the rotation axis of the rotor.

In an advantageous embodiment the radial weld portion connects a weld on the small radius with a weld on the large radius.

Thus, the radial weld portion bridges a radial offset between the welds on the small radius and the welds on the large radius. The radial weld portions do not have to be configured exactly in the radial direction. It is sufficient when the radial weld portions facilitate the radius change of the welds.

Thus, it is possible to form the continuous circumferential weld described supra.

According to an advantageous embodiment the welding is done by laser welding wherein a laser beam is directed to a first joining portion of the cover to melt the first joining portion into a melted material and wherein a second joining portion of the stator is melted by the melted material of the first joining portion.

This welding method is remarkable in particular since the elements to be welded can be made from a sintered material and a non-sintered material as stated supra.

The sintered material in the second joining portion is melted by the melted material from the non-sintered material of the first joining portion. The sintered material is not touched by the laser beam at any point in time. The laser beam is applied exclusively to the non-sintered material or coupled into the non-sintered material. Therefore the method can also be called indirect laser welding.

Advantageously the method provides a simple and stable mass producible weld between the non-sintered material and the sintered material. Furthermore the laser welding method is useable in a very flexible manner for various geometries of the components to be joined which furthermore significantly reduces the process and/or fabrication costs.

In order to better understand the invention the terms contact plane, joining contact and joining portion.

The contact plane is a virtual surface where the two components to be joined are applied in order to be able to be welded together. Thus, the first component is arranged on a first side of the contact plane and the second component is arranged on a second or opposite side of the contact plane during the welding. Thus, the two components contact each other at least in sections thus the two components form a joining contact.

The joining contact is a joint edge that runs along outer edge portions of the two components where the components contact each other. Thus, an outer edge portion of a first component can either contact an outer surface of the other component that extends beyond an outer edge of the first component or it can terminate flush with an outer edge of the other component. Two joining portions extend along the joining contact, in particular the first joining portion of the first component and the second joining portion of the second component.

The joining portion is a portion or a section of a component that is directly involved in the welding process. In the first component made from the non-sintered material it is the portion that is converted into melted material when the laser beam is applied. In the second component made from the sintered material it is the portion that is melted by the melted material from the first joining portion, so that the two joining portions are melted together or connected.

The laser beam is applied as a continuous or pulsed laser beam. Advantageously the laser beam is applied by laser beam-MIG hybrid welding. The laser beam MIG hybrid welding is a combination of a laser beam with a MIG welding process in a common process zone (MIG=metal inert gas welding). Thus, the advantages of both methods are used. A very deep burn in is achieved with a good flank connection. Thus, a very narrow heat impact zone with very little warpage is achieved. The process facilitates very high welding speeds which allows for a low energy introduction per unit of weld seam length. The main reason for the high level of efficiency is reduced weld preparation. Entire process steps can be omitted.

According to an advantageous embodiment the laser beam is oriented parallel to a contact plane during application wherein the cover and the stator are arranged along the contact plane to produce the joining contact.

Thus, the laser beam can produce its maximum effect and prevent energy losses.

Furthermore the laser beam can be oriented at an angle α during application, wherein the angle α is 45° at the most, in particular 30° at the most, in particular 15° at the most.

Therefore the laser beam has a stronger effect, the less the laser beam deviates from an orientation parallel to the contact plane or the less the angle α deviates from 0°. A deviation of the angle α from 0°, however, can be unavoidable, e.g. when the first joining portion cannot be reached by a laser beam that is parallel to the contact plane due component geometry. Up to an angle of 45° at the most the laser beam can have an effect that is sufficient to melt the joining portion of the first component.

An angled orientation of the laser beam is particularly suitable when the outer edge portion of the first component to be joined contacts an outer surface of the second portion that extends beyond an outer edge of the first portion. Thus, a risk of applying the laser beam to the second portion is minimized or an application of the laser beam to the first joining portion is facilitated.

In an advantageous embodiment a circumferential groove is formed in the cover and/or the stator before welding.

This groove or grooves can be filled in the finished component with a cooled and thus solidified melt from the first joining portion. Thus, the joining portions of the two components are welded together particularly well and the composite element thus created is particularly stable. In particular the composite body thus produced has a particularly high resistance against sheer forces. Furthermore the groove also has the advantage that gases generated during the welding process can be vented. These gases can interfere with clean welding so that venting helps to create a better weld. Furthermore the propensity of the weld to develop pores is reduced.

Advantageously the circumferential groove at the stator can be connected with a radial groove that connects the circumferential groove with the bore hole that is configured at the vane of the stator. When a plurality of vanes is provided the associated number of bore holes is connected through associated radial grooves with the circumferential groove. This yields particularly good venting of gases.

According to another aspect the object is achieved by a cam phaser for a cam shaft of an internal combustion engine, the cam phaser comprising a rotor, a stator and at least one cover, wherein the cover and the stator are produced by one of the methods described supra.

Accordingly all features apply that have been described supra with respect to the method. Accordingly the apparatus has the same advantages as described with respect to the method.

In an advantageous embodiment the cover has a material thickness of less than 6 mm, advantageously less than 5 mm, advantageously less than 4 mm, advantageously less than 3 mm, and particularly less than 2 mm.

The thinner the material of the cover, the more material weight and installation space can be saved in the cam phaser. Additionally materials savings cause cost savings. Welding a cover with a material thickness of only 2 mm or less can be implemented in particular by laser welding or hump welding.

According to an advantageous embodiment of the invention the stator is welded with two covers, wherein one cover is arranged at a side that is oriented towards the cam shaft and another cover is arranged at a side of the stator that is oriented away from the cam shaft.

The welding can be performed simultaneously. Thus, the electrodes are respectively applied to an outside of the cover, and a respective laser beam is aligned at both covers as described supra. Thus, welding the covers becomes particularly efficient.

According to another aspect of the invention the object is achieved by a cam phaser for a cam shaft of an internal combustion engine, the cam phaser comprising a rotor, a stator and at least one cover wherein the welds between the stator and the at least one cover are formed at least on a large radius and a small radius wherein the small radius is smaller than the large radius, wherein a circumferential weld is arranged which includes the welds on the large radius and the welds on the small radius and wherein the circumferential weld is configured essentially clover shaped viewed in a rotation axis direction of the rotor.

Thus, a particularly stable cam phaser can be provided that has high resistance against buckling of the cover during operations.

According to another aspect the object is achieved by a cam phaser for a cam shaft of an internal combustion engine, the cam phaser including a rotor, a stator and at least one cover, wherein welds between the stator and the at least one cover are configured on at least a large radius and a small radius, wherein the small radius is smaller than the large radius, wherein the weld on the large radius and the weld on the small radius are configured separate from each other.

Subsequently embodiments of the invention are described. The subsequently described aspects are also combinable with the embodiments and aspects described supra.

Other embodiments of the invention relate to a method for producing a cam phaser for an internal combustion engine, the cam phaser including, a stator, a rotor and at least one cover, the method including the steps providing a cover with at least one welding contour, applying the welding contour to the stator, and welding the cover with the stator at the welding contour.

According to an advantageous embodiment the welding is performed by hump welding or laser welding.

Hump welding is a special type of resistance welding and thus a welding method for electrically conductive materials based on joule electrical heating from electrical currents running through the joint. The joining partners, thus the stator and the cover are heated until a welding temperature is reached and welded at the joint while a force is applied and the welding is performed through re-solidification of the melt, through diffusion or also in a solid phase. The advantage of resistance welding is in a particularly high welding speed. During hump welding or resistance hump welding the joint, this means the weld contour is configured punctiform by a rise or a so called hump. This has the advantage that a current density required for the welding is not generated by the electrodes but by the component shape, thus by the rise or the hump. The electrodes are thus used for current feeding and force introduction. The hump welding is particularly quick. This is very gentle on the material of the cover which therefore can be configured with a very small material thickness.

Advantageously the rise is punctiform. After application of the cover, the cover is connected with the stator only through the at least one rise. Furthermore the rise is enveloped by an in particular circular protrusion which is directly adjacent to the rise. The rise according to the invention is ideally a circular cone that protrudes from a depression and that is also designated as the hump. The cover is applied to the stator in a point where a tip of the circular cone is formed in order to weld the cover together with the stator.

The described method for producing the cam phaser has the advantage that the welding can be performed very quickly and without additional welding materials like e.g. welding wire. The recess facilitates better joining of the cover with the stator.

In a particularly advantageous embodiment capacitor discharge welding is used for the hump welding. The capacitor discharge welding, abbreviated CD welding, also designated as capacitor impulse welding differs from conventional resistance welding in the type of energy generation and is used in particular for hump welding. The energy is imparted from charged capacitors through a welding transformer to the connection partners. The charging current can thus be smaller by several orders of magnitude than the subsequent discharge current so that an impulse loading of the electrical grid and possibly its overload can be prevented. Therefore no current spikes are generated in a grid conductor. Thus, the fabrication method becomes even more efficient.

In another advantageous embodiment the welding is performed by laser welding. The laser welding is suitable for connecting materials that can be welded with conventional welding methods only with great difficulty or not at all due to the small amount of melted material and due to a controllable melting duration. Though the laser welding is slower than the resistance welding recited supra it has the advantage that the welding can be performed one sided or from one side. Thus, no counter piece like an electrode arranged between the joining partners is required. The laser welding furthermore has the advantage that the joining partners do not have to be fabricated from an electrically conductive material.

It is furthermore advantageous that laser welding facilitates a variable welding geometry with narrow weld shapes and that components can be joined with little thermal warpage. Also this method can be performed with or without additive materials.

According to the invention the cover and the stator are pressed together with a pressure in particular between 10 kN and 40 kN wherein the pressure is a function of component size. A pressure at this level facilitates current flow between the cover and the stator at a connection point. Thus, the welding is further accelerated.

In an advantageous embodiment the welding is performed from an outside through the cover. The outside or the side oriented away from the cover is reachable particularly well for a welding apparatus, e.g. an electrode of the welding apparatus. This way the fabrication of the cam phaser is highly simplified.

In a particularly advantageous embodiment the welding is performed at several weld contours along an outer edge of the cover. Thus, annular edge welding which is a special form of hump welding is advantageously used for the welding.

Advantageously all welding contours are simultaneously welded along the outer edge. In particular a proprietary or separate electrode pair is applied at each weld that is to be produced. The welding thus becomes very efficient.

According to another advantageous embodiment the welding is performed at several welding contours that are arranged offset from each other, thus gaps are generated during the welding and no continuous weld seam or weld line. This saves energy and complexity.

Advantageously the welding is performed at several weld contours that are arranged on common circular path. Due to the circular arrangement of the weld contours the resulting weld is particularly stable between the weld partners. Furthermore the circular path can be arranged along the outer edge of the cover or also further inside a cover area.

In an advantageous embodiment the welding is performed at least at one weld contour with a vane of the stator. Thus, the cover is connectable at least in one portion between two vane chambers with the stator through welding. Thus, the respective weld is enveloped by a rather large contact surface of the cover on the stator which has an advantageous effect upon stability of the connection. A high stability of the connection is required since an oil pressure of up to 50 bar and for short periods of time even above that can impact the cover from the vane chambers.

Furthermore the cover is advantageously produced from an electrically conductive material. This has an advantageous effect upon the ability to perform the welding between the cover and the stator. For example the cover and the stator are produced by a hump welding method and the weld contours are formed by protrusions. Thus, electrically conductive materials are advantageously used for the cover.

Alternatively the cover and the stator can be welded by a laser welding method, wherein the weld contour is formed by a circumferential weld or plural welds.

BRIEF DESCRIPTION OF THE DRAWINGS

Further advantages of the invention can be derived from the description and the drawing figures. The invention is subsequently described based on an embodiment with reference to drawing figures, wherein.

DETAILED DESCRIPTION OF THE INVENTION

Figure 1:
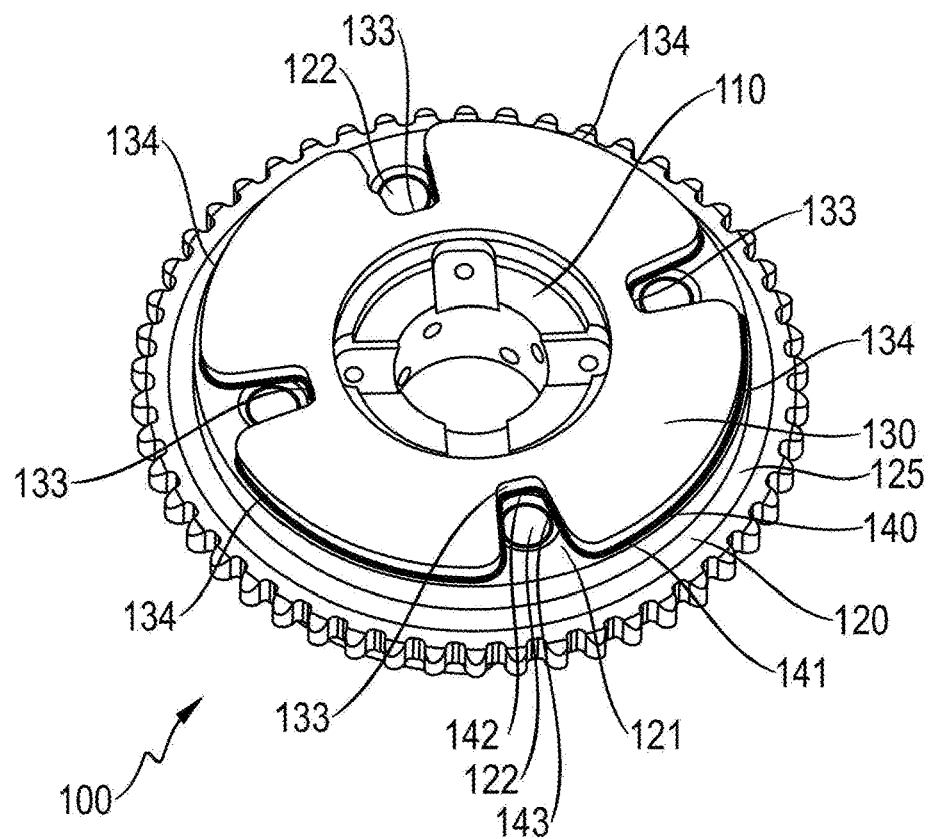
FIG. 1 illustrates a first embodiment of a cam phaser according to the invention produced according to a method according to the invention.

FIG. 1 illustrates a first embodiment of a cam phaser 100 according to the invention that is produced according to the method according to the invention.

Figure 2:
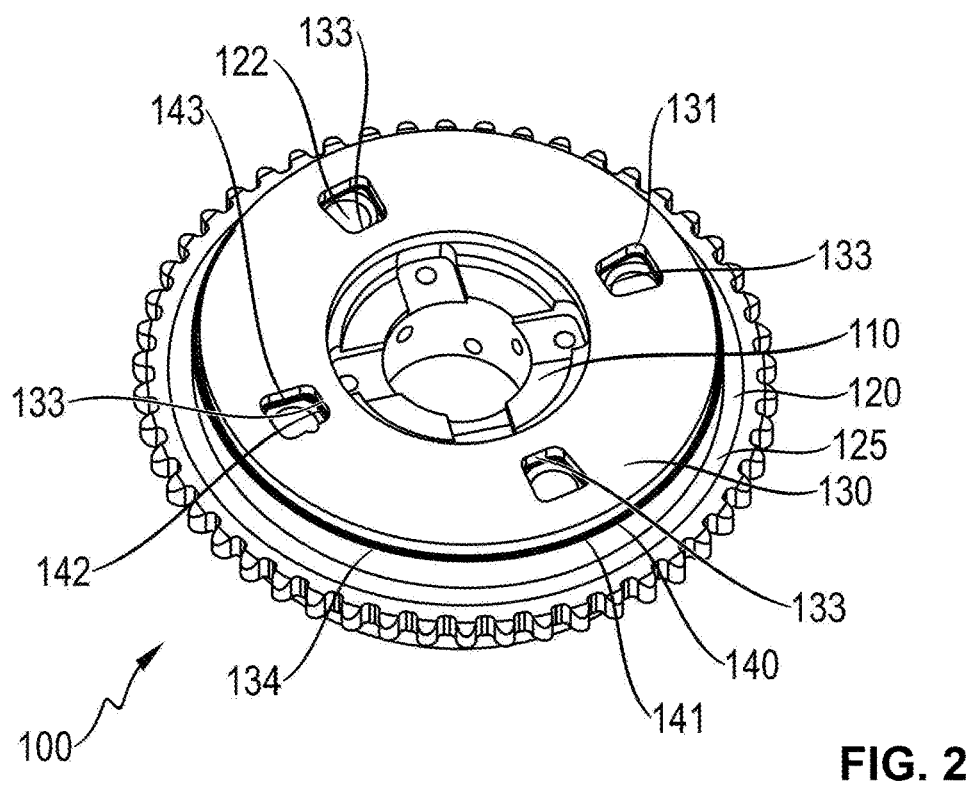
FIG. 2 illustrates a second embodiment of the cam phaser according to the invention produced according to the method according to the invention.

The cam phaser 100 includes a rotor 110 wherein FIGS. 1 and 2 illustrate only an inner portion of the rotor. The rotor 110 is configured rotatable relative to a stator 120 of the cam phaser 100. The stator 120 of the cam phaser 100 is shown in detail in FIG. 4 and is described in detail with reference to FIG. 4.

A cover 130 is arranged at the stator 120. The cover 130 is configured disc shaped or circular segment shaped. The cover 130 is configured to cover pressure chambers between the stator 120 and the rotor 110. Thus, a high pressure impacts the cover 130. This pressure can have the effect that surface portions of the cover 130 bulge outward. In order to prevent this the cover 130 is welded with the stator 120 in a special manner. In particular the cover 130 is welded on a small radius 133 and on a large radius 134 with the stator 120 wherein the term radius relates to the cover 130. Thus, a circumferential weld 140 is not only formed at an outer radius of the cover 130 but also further inside.

The circumferential weld 140 thus includes welds 142 at the small radius 133 and welds 141 at the large radius 134. The large radius 134 corresponds to the outer radius of the cover 130.

The weld 140 furthermore includes radial weld portions 143 between the welds 141 and the welds 142 wherein the radial weld portions respectively connect a weld 141 on the large radius 134 and a weld 142 on the small radius 133. The radial weld portions 133 thus bridge the radial offset between the welds 141 and the welds 142. Thus, the radial weld portions 143 do not have to be configured exactly in the radial direction. It is sufficient that the radial weld portions facilitate the radius change of the circumferential weld 140.

Thus, the circumferential weld 140 is configured continuous in FIG. 1, thus without interruption.

The stator 120 includes plural vanes 121. The vanes 121 extend from an annular body 125 of the stator 120 radially inward. Therefore the vanes 121 are particularly suitable to form the welds 142 on the small radius 133 on the vanes 121. Accordingly the welds 142 in FIG. 1 on the small radius 133 are arranged on the vanes 121.

Figure 4:
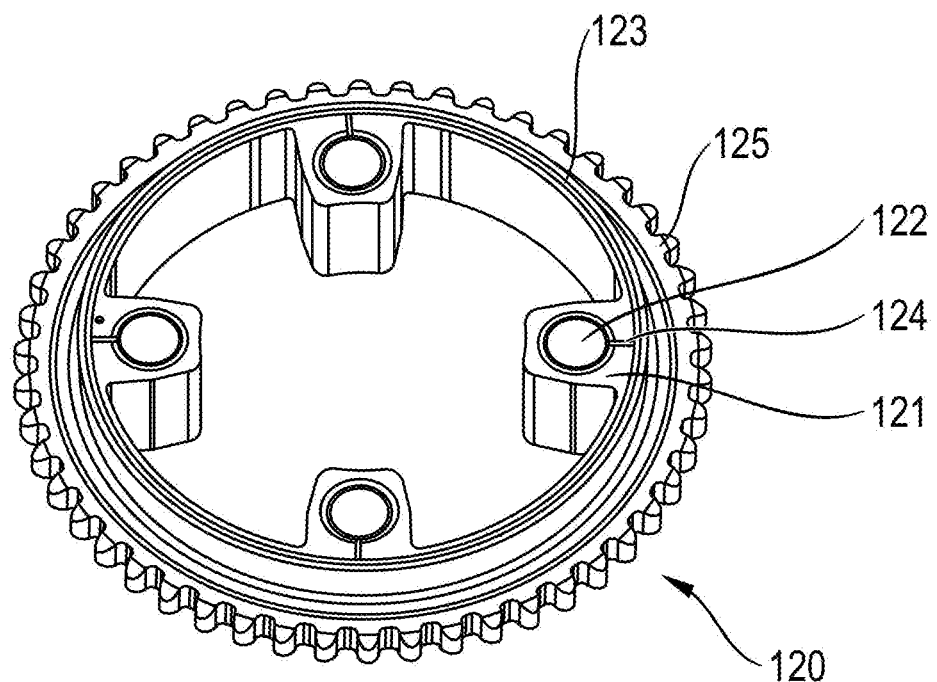
FIG. 4 illustrates a view of the stator of the cam phaser of the first and second embodiment.

FIGS. 1, 2, and 4 illustrate a stator 120 with four vanes 121. The stator 120, however, can also have a different number of vanes 121, for example three or five vanes. Accordingly also another number of welds is conceivable on the small radius 133. Thus, the four welds 142 are formed on the small radius 133. Thus each of the welds 142 is associated with one of the vanes 121. Thus, four welds 141 are also arranged in the portion between the vanes 121.

The circumferential weld 140 that includes the welds 141, 142 and 143 is configured essentially clover shaped in a radial axial direction of the rotor R. In particular the weld 140 is configured as a four leaf clover. Thus, each individual clover is formed by one of the welds at the large radius 134 and by two adjacent weld portions 143. The individual clover leafs are then connected by one of the welds 142 on the small radius 133.

FIG. 2 illustrates a second embodiment of the cam phaser 100 according to the invention. The second embodiment has common features with the first embodiment in FIG. 1. These features are not being repeated, however, they are transferable to FIG. 2. In particular the rotor 110 and the stator 120 are configured identical. The description of FIG. 2 therefore does not focus on aspects that differ from the embodiment illustrated in FIG. 1.

The cover 130 in FIG. 2 is also configured disc shaped, however, not clover shaped. The cover 130 is rather formed annular disc shaped and includes plural recesses 131. The cover 130 is arranged above the stator 120 so that the recesses 131 are respectively arranged above one of the vanes 121. Corresponding to the number of the vanes 121 four recesses 131 are also formed here. It is appreciated that also here another number of vanes 121 and recesses 131 can be formed. In an exemplary manner three, five or six elements can be arranged.

An inward oriented edge of the recess 131 is arranged on the small radius 133 so that the welds 142 are arranged on the small radius. Also on the opposite edge, thus on the outward oriented edge welds are arranged. Furthermore welds are also formed at radial weld portions 143 between the two edges. Overall also the inner circumference of the recess 131 is connected by a continuous weld with the stator 120. Thus the continuous weld has the shape of the recess 131 in the cross section, this means in the rotation axis direction of the rotor 110. The welds 141 formed on the large radius 134 and the welds 142 formed on the small radius 133 are separate from each other in this embodiment.

The welds 141 on the large radius 134 are configured in FIG. 2 as a circumferential weld 140. The weld 140 runs along the outer radius of the circular cover 130.

It is provided in a non-illustrated embodiment that the weld 140 is configured as a continuous weld exclusively on the large radius 134. The recesses 131 are not welded together with the stator 120 in this embodiment. The sealing is only provided by applying the cover 130 onto an advantageously ground contact surface of the stator 120.

Advantageously it is also conceivable to provide a weld 142 exclusively on the small radius 133 or to weld exclusively about the recesses 131.

FIGS. 1 and 2 illustrate the cam phaser 100 from a side that is oriented away from the cam shaft. A cover 130 configured as described supra can also be arranged from the side oriented towards the cam shaft. Thus, the cover 130 is advantageously configured as a locking plate or locking disc on a side oriented towards the cam shaft, e.g. with a closure flap, whereas the cover 130 is configured as a simple cover plate on a side oriented away from the cam shaft.

Figure 3:
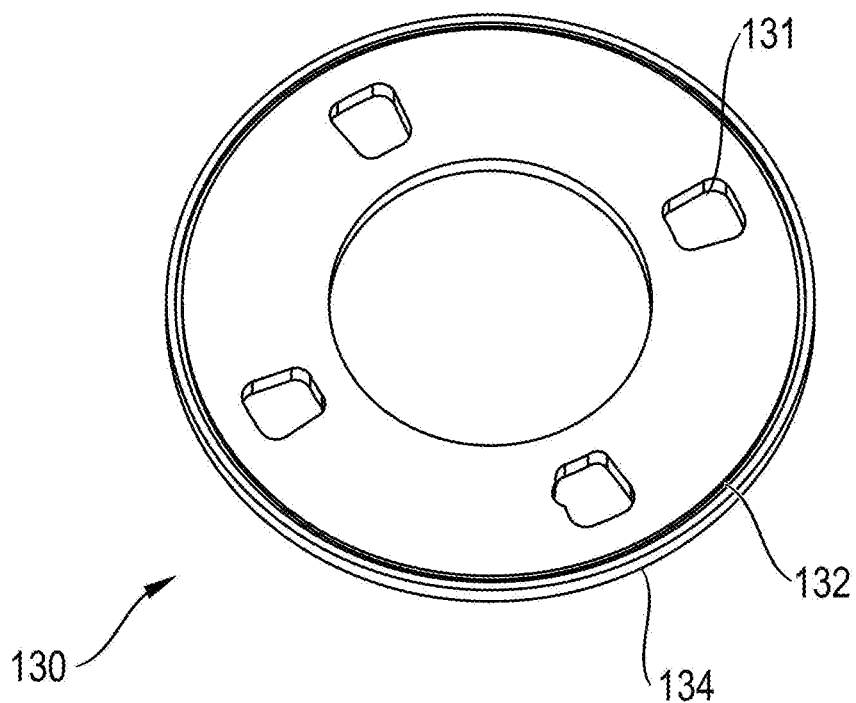
FIG. 3 illustrates a view of the cover of the cam phaser according to the second embodiment of FIG. 2.

FIG. 3 illustrates the cover 130 of the cam phaser 100 of the second embodiment of FIG. 2. The cover 130 shows the recesses 131 that are configured as openings. Furthermore the cover 130 includes a circumferential groove 132. The circumferential groove 132 runs on a radius adjacent to the large radius 134. Accordingly the groove 132 can support the welding, in particular gasses can be vented.

FIG. 4 illustrates the stator 120 of the cam phaser 100 in the first and second embodiment. The stator 120 includes four vanes 121 that extend inward from an annular element 125. A continuous opening or bore hole 122 is arranged in each vane 121.

A circumferential groove 123 is configured at the stator 120. The circumferential groove 123 is formed on the same radius as the circumferential groove 132. Consequently also the radius of the circumferential groove 123 is smaller than the large radius 134. The bore holes 122 are connected through radial grooves 124 with the circumferential groove 123. Thus, gasses can be vented particularly easily. Melted material from the cover 130 can run into the radial groove 124 during welding so that the connection is particularly good.

All features described and illustrated in a context with individual embodiments of the invention can be provided according to the invention in different combinations while still bringing their advantages to bear. The spirit and scope of the invention is defined by the appended claims and is not limited to the features described in the description or illustrated in the drawing figure.

What is claimed is:

1. A method for producing a cam phaser for a cam shaft of an internal combustion engine, the cam phaser including a rotor, a stator and at least one cover, the method comprising:

arranging the at least one cover at the stator; and
welding the at least one cover with the stator,
wherein a first weld, a second weld and a third weld are formed on a large radius and on a small radius during the welding,
wherein the small radius is smaller than the large radius,
wherein the second weld is formed on the large radius and the third weld is formed on the small radius,
wherein the third weld on the small radius is arranged and attached at a radially inward extending vane of the stator,
wherein a borehole is arranged in the radially inward extending vane of the stator, and
wherein the third weld is formed on the small radius closer to a rotation axis of the rotor than the borehole.

2. The method according to claim 1, wherein the first weld includes radial weld portions which extend in an essentially radial direction relative to a rotation axis of the rotor.

3. The method according to claim 2, wherein the radial weld portions connect the third weld on the small radius with the second weld on the large radius.

* * * * *